United States Patent [19]
Ishii et al.

[11] Patent Number: 5,978,243
[45] Date of Patent: Nov. 2, 1999

[54] AC/DC CONVERTING CIRCUIT

[75] Inventors: Shinichi Ishii, Saitama; Hiroshi Miki, Hyogo, both of Japan

[73] Assignee: Fuji Electric Co., Ltd., Japan

[21] Appl. No.: 08/869,125

[22] Filed: Jun. 4, 1997

[30]     Foreign Application Priority Data

Jun. 5, 1996  [JP]  Japan ................................. 8-142463

[51] Int. Cl.⁶ ..................................................... H02M 5/42
[52] U.S. Cl. ................................................ 363/89; 363/84
[58] Field of Search ................................ 363/52, 53, 84, 363/89, 125, 127

[56]             References Cited

U.S. PATENT DOCUMENTS 4,193,111   3/1980   Wester ....................................... 363/84
   5,654,882   8/1997   Kanazawa et al. ......................... 363/89
   5,687,065  11/1997   Majid .......................................... 363/89
   5,751,567   5/1998   Toyozaki et al. .......................... 363/89

*Primary Examiner*—Matthew Nguyen
*Attorney, Agent, or Firm*—Rossi & Associates

[57]           ABSTRACT

An ac/dc converting circuit adapted to output a direct voltage that is higher than a full wave rectified voltage of an alternating input voltage is provided which includes an alternating current filter, and a condenser with a positive electrode and a negative electrode coupled to a dc output side of a full wave rectifying circuit. The full wave rectifying circuit includes a switching portion having upper and lower arms each having a semiconductor rectifying element and a self-commutated semiconductor switching element, and a rectifying portion having upper and lower arms each having a semiconductor rectifying element. The semiconductor rectifying elements in the upper arms of the full wave rectifying circuit has a common cathode coupled to the positive electrode, and the semiconductor rectifying elements in the lower arms has a common anode coupled to the negative electrode. The ac/dc converting circuit further includes a resistor provided between a coupling point of the rectifying elements of the upper arms of the fill wave rectifying circuit and the negative electrode. In operation, a signal for controlling an ON/OFF state of the switching element of the lower arm of the switching portion is generated while the switching element of its upper arm is in an OFF state, when the direct output voltage is higher than the input alternating voltage, and a voltage at an ac input terminal between the rectifying elements of the switching portion is lower than a voltage at an ac input terminal between the rectifying elements of the rectifying portion.

2 Claims, 14 Drawing Sheets

AC/DC CONVERTING CIRCUIT

FIELD OF THE INVENTION

The present invention generally relates to an ac/dc converting circuit which is able to produce a direct output voltage that is higher than a voltage obtained by rectifying the full wave of an alternating input voltage, and in particular to such an ac/dc converting circuit that is characterized in a method of disposing of regenerative energy and a method of initially charging a condenser on the dc side for limiting or restricting a rush current flowing into the condenser.

BACKGROUND OF THE INVENTION

A known method of disposing of the regenerative energy from a load in the above type of ac/dc converting circuit will be described referring to FIG. 13, and a known method of initially charging a dc side condenser will be described referring to FIG. 14. The basic operation of a full wave rectifying circuit in the ac/dc converting circuit is disclosed in detail in Japanese Patent No. 7-79548 titled "AC/DC CONVERTING CIRCUIT", for example, and therefore will not be explained herein.

Initially, the method of disposing of the regenerative energy from the load will be described. A main circuit arrangement shown in FIG. 13 includes an ac power supply 1 for the system, ac reactor 2, switching portion 3 in which two reverse parallel circuits of a self-commutated semiconductor switching element, such as IGBT, and a diode are coupled in series, and a rectifying portion 4 that is a series circuit of two diodes. The circuit arrangement further includes a dc side condenser 5, load 6, resistor 7, direct voltage detector 8 for detecting the terminal voltage of the condenser 5, input current detector 9, input voltage detector 10, converter control device 11, comparator 13, level setting device 14, monostable multivibrator 15, and a semiconductor switching element 19 connected in series to the resistor 7. In this arrangement, the switching portion 3 and rectifying portion 4 constitute a full wave rectifying circuit.

In the above-described main circuit arrangement, the electric energy that returns from the load 6 cannot be regenerated into the ac input side, but is stored as a charge in the condenser 5. As a result, the terminal voltage of the condenser 5 increases, and the resultant voltage is applied to both ends of each of the switching portion 3 and rectifying portion 4. It is therefore necessary to limit this voltage to be equal to or lower than allowable values of the elements in these portions 3, 4.

To this end, the comparator 13 compares the terminal voltage of the condenser 5 detected by the direct voltage detector 8 with a predetermined value set by the level setting device 14, and, if the terminal voltage exceeds the predetermined value, the monostable multivibrator 15 operates to produce output pulses for activating the switching element 19. As a result, the discharge current of the condenser 5 flows through the resistor 7, so that the regenerative energy is consumed by the resistor 7, thereby reducing the terminal voltage of the condenser 5.

The method of initially charging the dc side condenser 5 will be now explained. As well known in the art, the initial charging of the condenser 5 is needed to restrict the rush current flowing into the condenser 5 when the ac power supply 1 is turned on.

In FIG. 14, the same reference numerals as used in FIG. 13 are used to identify the same constituent elements as used in the arrangement of FIG. 13. In the circuit arrangement of FIG. 14, a thyristor 22 as a semiconductor switching element is connected between the cathode of the diode in the upper arm of the rectifying portion 4, and the positive electrode of the condenser 5, and the resistor 7 is connected between the opposite ends of the thyristor 22. This thyristor 22 is adapted to be activated in response to an output signal from the comparator 13.

In the circuit of FIG. 14, the thyristor 22 is in the OFF state when the ac power supply 1 is turned on, and the rush current flowing into the condenser 5 is limited by the resistor 7. Once the voltage of the condenser 5 reaches a given value after turning-on of the power supply 1, the thyristor 22 is activated in response to the output signal from the comparator 13, so that the main circuit of FIG. 14 starts operating as a circuit arrangement in which the resistor 7 is substantially eliminated.

In the arrangements of FIG. 13 and FIG. 14, accessory components, such as a semiconductor switching element and a resistor, need to be individually connected for different purposes to the main circuit including the fill wave rectifying circuit, which may undesirably increase the number of components, volume of the apparatus, and the manufacturing cost.

SUMMARY OF THE INVENTION

It is therefore an object of the present invention to provide an ac/dc converting circuit which is able to appropriately dispose of the regenerative energy and effect initial charging of the dc side condenser, only by adding the minimum component(s) to the full wave rectifying circuit.

To accomplish the above object, there is provided according to the first aspect of the present invention an ac/dc converting circuit adapted to output a direct voltage that is higher than a full wave rectified voltage of an alternating input voltage, comprising: an alternating current filter provided in series on an ac input side of a full wave rectifying circuit; a condenser having a positive electrode and a negative electrode coupled to a dc output side of the full wave rectifying circuit; the full wave rectifying circuit including a switching portion having an upper arm and a lower arm formed by coupling a first semiconductor rectifying element reversely coupled in parallel with a first self-commutated semiconductor switching element, in series with a second semiconductor rectifying element reversely coupled in parallel with a second self-commutated semiconductor switching element, and a rectifying portion having an upper arm and a lower arm formed by coupling a third semiconductor rectifying element in series with a fourth semiconductor rectifying element, the first and third semiconductor rectifying elements in the upper arms of the switching portion and the rectifying portion having a common cathode coupled to the positive electrode, the second and fourth semiconductor rectifying elements in the lower arms of the switching portion and the rectifying portion having a common anode coupled to the negative electrode, the full wave rectifying circuit having first and second ac input terminals respectively provided by a coupling point of the first and second rectifying elements of the switching portion and a coupling point of the third and fourth rectifying elements of the rectifying portion; and a resistor provided between the coupling point of the first and second rectifying elements of the switching portion and the positive electrode; wherein a signal for controlling an ON/OFF state of the second switching element of the lower arm is generated while the first switching element of the upper arm is placed in an OFF state, when the direct output voltage is higher than the input alternating voltage, and a voltage at the first ac input terminal coupled to the resistance is lower than a voltage at the second ac input terminal.

According to the second aspect of the present invention, there is provided an ac/dc converting circuit adapted to output a direct voltage that is higher than a full wave rectified voltage of an alternating input voltage, comprising: an alternating current filter provided in series on an ac input side of a full wave rectifying circuit; a condenser having a positive electrode and a negative electrode coupled to a dc output side of the full wave rectifying circuit; the full wave rectifying circuit including a switching portion having an upper arm and a lower arm formed by coupling a first semiconductor rectifying element reversely coupled in parallel with a first self-commutated semiconductor switching element, in series with a second semiconductor rectifying element reversely coupled in parallel with a second self-commutated semiconductor switching element, and a rectifying portion having an upper arm and a lower arm formed by coupling a third semiconductor rectifying element in series with a fourth semiconductor rectifying element, the first and third semiconductor rectifying elements in the upper arms of the switching portion and the rectifying portion having a common cathode coupled to the positive electrode, the second and fourth semiconductor rectifying elements in the lower arms of the switching portion and the rectifying portion having a common anode coupled to the negative electrode, the full wave rectifying circuit having first and second ac input terminals respectively provided by a coupling point of the first and second rectifying elements of the switching portion and a coupling point of the third and fourth rectifying elements of the rectifying portion; and a resistor provided between the coupling point of the first and second rectifying elements of the switching portion, and the negative electrode; wherein a signal for controlling an ON/OFF state of the first switching element of the upper arm is generated while the second switching element of the lower arm is placed in an OFF state, when the direct output voltage is higher than the input alternating voltage, and a voltage at the first ac input terminal coupled to the resistor is lower than a voltage at the second ac input terminal.

According to the third aspect of the present invention, there is provided an ac/dc converting circuit adapted to output a direct voltage that is higher than a full wave rectified voltage of an alternating input voltage, comprising: an alternating current filter provided in series on an ac input side of a full wave rectifying circuit; a condenser having a positive electrode and a negative electrode coupled to a dc output side of the full wave rectifying circuit; the full wave rectifying circuit including a switching portion having an upper arm and a lower arm formed by coupling a first semiconductor rectifying element reversely coupled in parallel with a series circuit of a first self-commutated semiconductor switching element and a second semiconductor rectifying element, in series with a third semiconductor rectifying element reversely coupled in parallel with a series circuit of a second self-commutated semiconductor switching element and a fourth semiconductor rectifying element, and a rectifying portion having an upper arm and a lower arm formed by coupling a fifth semiconductor rectifying element in series with a sixth semiconductor rectifying element, the first semiconductor rectifying element of the upper arm of the switching portion and the fifth rectifying element of the upper arm of the rectifying portion having a common cathode coupled to the positive electrode, the third semiconductor rectifying element of the lower arm of the switching portion and the sixth rectifying element of the lower arm of the rectifying portion having a common anode coupled to the negative electrode, the full wave rectifying circuit having first and second ac input terminals respectively provided by a coupling point of the first and third rectifying elements of the switching portion and a coupling point of the fifth and sixth rectifying elements of the rectifying portion; a first resistor provided between a coupling point of the first switching element and the second semiconductor rectifying element of the upper arm of the switching portion, and the negative electrode; and a second resistor provided between a coupling point between the second switching element and the fourth semiconductor rectifying element of the lower arm of the switching portion, and the positive electrode; wherein a signal for controlling an ON/OFF state of the second switching element of the lower arm is generated while the first switching element of the upper arm is placed in an OFF state, when the direct output voltage is higher than the input alternating voltage, and a voltage at the first ac input terminal provided by the coupling point of the first and third semiconductor rectifying elements of the switching portion is lower than a voltage at the second ac input terminal provided by the coupling point of the fifth and sixth rectifying elements of the rectifying portion.

According to the fourth aspect of the present invention, there is provided an ac/dc converting circuit adapted to output a direct voltage that is higher than a fill wave rectified voltage of an alternating input voltage, comprising: an alternating current filter provided in series on an ac input side of a full wave rectifying circuit; a condenser having a positive electrode and a negative electrode coupled to a dc output side of the fill wave rectifying circuit; the full wave rectifying circuit including to first and second switching portions each having an upper arm and a lower arm formed by coupling a first semiconductor rectifying element in series with a second semiconductor rectifying element to which a self-commutated semiconductor switching element is reversely coupled in parallel, the first rectifying elements of the upper arms of the first and second switching portions having a common cathode coupled to the positive electrode, the second rectifying elements of the lower arms of the first and second switching portions having a common anode coupled to the negative electrode, the full wave rectifying circuit having first and second ac input terminals respectively provided by a coupling point of the first and second rectifying elements of the first switching portion, and a coupling point of the first and second rectifying elements of the second switching portion; and a resistor provided between the coupling point of the first and second rectifying elements of the first switching portion, and the positive electrode; wherein a signal for controlling an ON/OFF state of the switching element of the first switching portion is generated while the switching element of the second switching portion is placed in an OFF state, when the direct output voltage is higher than the input alternating voltage, and a voltage at the first ac input terminal coupled to the resistor is lower than a voltage at the second ac input terminal.

According to the fifth aspect of the present invention, there is provided an ac/dc converting circuit adapted to output a direct voltage that is higher than a full wave rectified voltage of an alternating input voltage, comprising: an alternating current filter provided in series on an ac input side of a full wave rectifying circuit; a condenser having a positive electrode and a negative electrode coupled to a dc output side of the full wave rectifying circuit; the full wave rectifying circuit including first and second switching portions each having an upper arm and a lower arm formed by coupling a first semiconductor rectifying element in series with a second semiconductor rectifying element to which a series circuit of a self-commutated semiconductor switching element and a third semiconductor rectifying element is reversely coupled in parallel, the first rectifying elements of the first and second switching portions having a common cathode coupled to the positive electrode, the second rectifying elements of the first and second switching portions having a common anode coupled to the negative electrode, the full wave rectifying circuit having first and second ac input terminals respectively provided by a coupling point of the first and third rectifying elements of the first switching portion, and a coupling point of the first and third rectifying elements of the second switching portion; a first resistor provided between a coupling point of the third semiconductor rectifying element and the switching element of the first switching portion, and the positive electrode; and a second resistor provided between a coupling point of the third semiconductor rectifying element and the switching element of the second switching portion, and the positive electrode; wherein a signal for controlling an ON/OFF state of the switching element of the first switching portion is generated while the switching element of the second switching portion is placed in an OFF state, when the direct output voltage is higher than the input alternating voltage, and the input alternating voltage at a coupling point of the switching element of the first switching portion and the first resistor is lower than the input alternating voltage at a coupling point of the switching element of the second switching portion and the second resistor; and wherein a signal for controlling an ON/OFF state of the switching element of the second switching portion is generated while the switching element of the first switching portion is placed in an OFF state, when the direct output voltage is higher than the input alternating voltage, and the input alternating voltage at a coupling point of the switching element of the first switching portion and the first resistor is higher than the input alternating voltage at a coupling point of the switching element of the second switching portion and the second resistor.

According to the sixth aspect of the present invention, there is provided an ac/dc converting circuit adapted to output a direct voltage that is higher than a full wave rectified voltage of an alternating input voltage, comprising: an alternating current filter provided in series on an ac input side of a full wave rectifying circuit; a condenser having a positive electrode and a negative electrode coupled to a dc output side of the full wave rectifying circuit; the full wave rectifying circuit including first and second switching portions each having an upper arm and a lower arm formed by coupling a first semiconductor rectifying element to which a series circuit of a self-commutated switching element and a second semiconductor rectifying element is reversely coupled in parallel, in series with a third semiconductor rectifying element, the first rectifying elements of the first and second switching portions having a common cathode coupled to the positive electrode, the third rectifying elements of the first and second switching portions having a common anode coupled to the negative electrode, the fill wave rectifying circuit having first and second ac input terminals respectively provided by a coupling point of the second and third rectifying elements of the first switching portion, and a coupling point of the second and third rectifying elements of the second switching portion; a first resistor provided between a coupling point of the switching element and the second semiconductor rectifying element of the first switching portion, and the negative electrode; and a second resistor provided between a coupling point of the switching element and the first semiconductor rectifying element of the second switching portion, and the negative electrode; wherein a signal for controlling an ON/OFF state of the switching element of the first switching portion is generated while the switching element of the second switching portion is placed in an OFF state, when the direct output voltage is higher than the input alternating voltage, and the input alternating voltage at a coupling point of the switching element of the first switching portion and the first resistor is lower than the input alternating voltage at a coupling point of the switching element of the second switching portion and the second resistor; and wherein a signal for controlling an ON/OFF state of the switching element of the second switching portion is generated while the switching element of the first switching portion is placed in an OFF state, when the direct output voltage is higher than the alternating input voltage, and the alternating input voltage at a coupling point of the switching element of the first switching portion and the first resistor is higher than the alternating input voltage at a coupling point of the switching element of the second switching portion and the second resistor.

In the ac/dc converting circuit according to the first through sixth aspects of the invention, the self-commutated semiconductor switching element in the full wave rectifying circuit can be also used as a switching element for causing the resistor to consume regenerative energy stored in the condenser.

In the ac/dc converting circuit according to the first, third or fifth aspect of the invention, a semiconductor switching element, such as a thyristor, may be provided between the cathode commonly coupled to the semiconductor rectifying elements of the upper arms of the full wave rectifying circuit, and a coupling point of the resistor and the positive electrode.

In the ac/dc converting circuit according to the second, fourth or sixth aspect of the invention, a semiconductor switching element, such as a thyristor, may be provided between the anode commonly coupled to the semiconductor rectifying elements of the lower arms of the full wave rectifying circuit, and a coupling point of the resistor and the negative electrode.

In the above arrangements, the ac/dc converting circuit can fulfill the function of avoiding rush current by initially charging the condenser, as well as the function of disposing of regenerative energy stored in the dc side condenser, by only adding a thyristor or self-commutated semiconductor switching element to the ac/dc circuit according to the first to sixth aspects of the invention.

BRIEF DESCRIPTION OF THE DRAWINGS

This invention will be described in greater detail with reference to certain preferred embodiments thereof and the accompanying drawings, wherein.

DETAILED DESCRIPTION OF THE PREFERRED EMBODIMENTS

Figure 1:
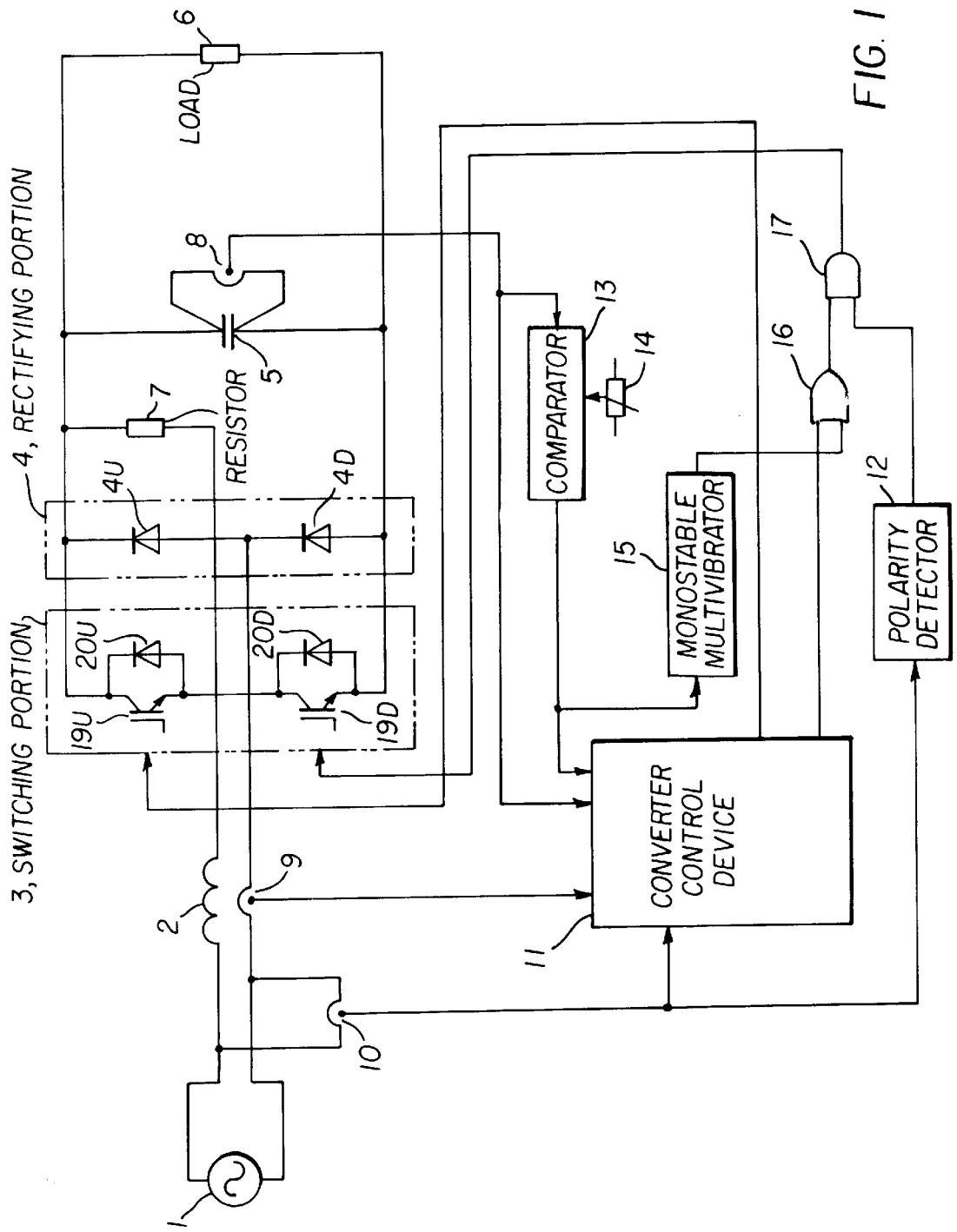
FIG. 1 is a circuit diagram showing the first embodiment of the present invention.

Referring to the drawings, presently preferred embodiments of the present invention will be described.

Figure 13:
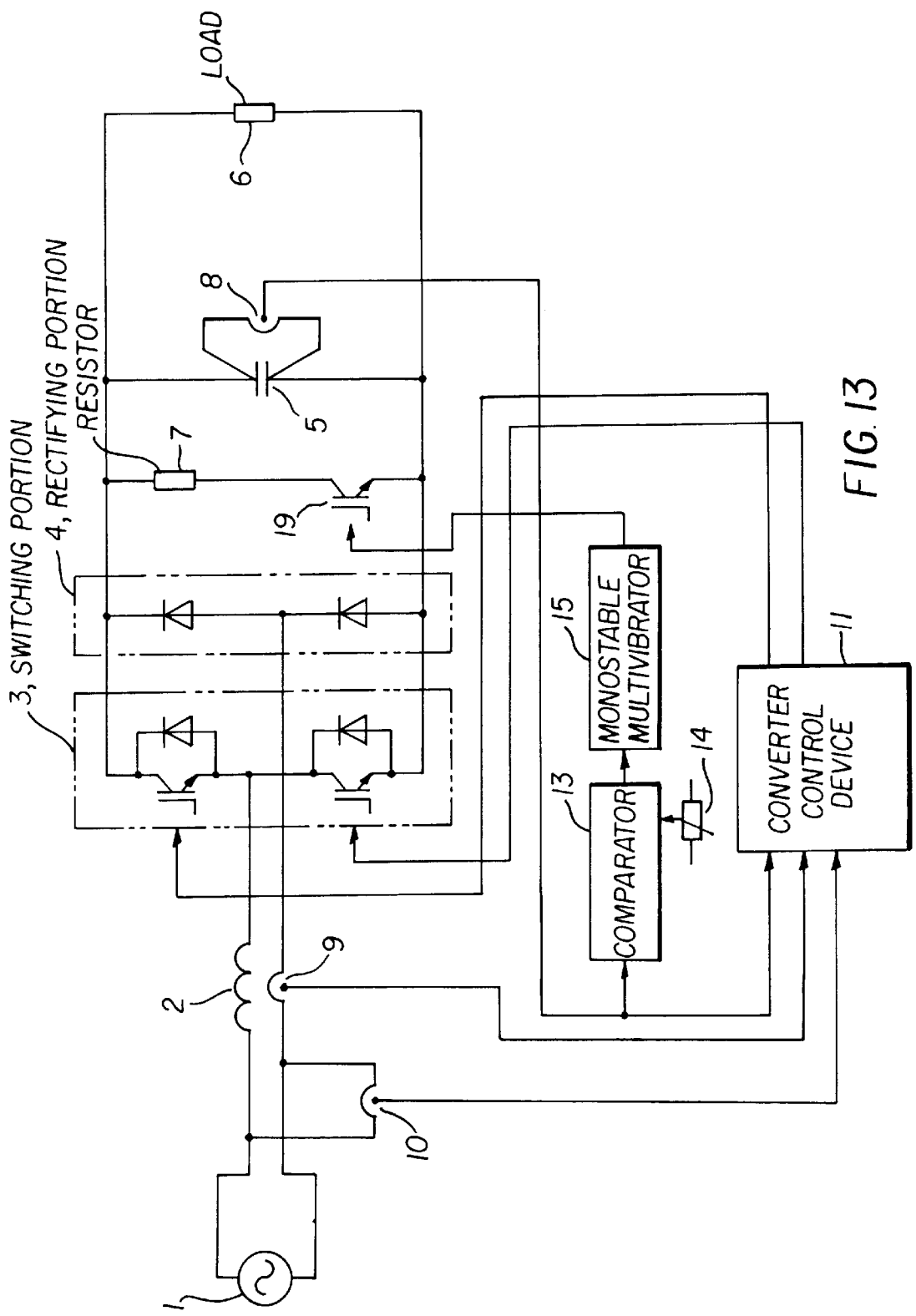
FIG. 13 is a circuit diagram for explaining a conventional method for disposing of energy from a load.
Figure 14:
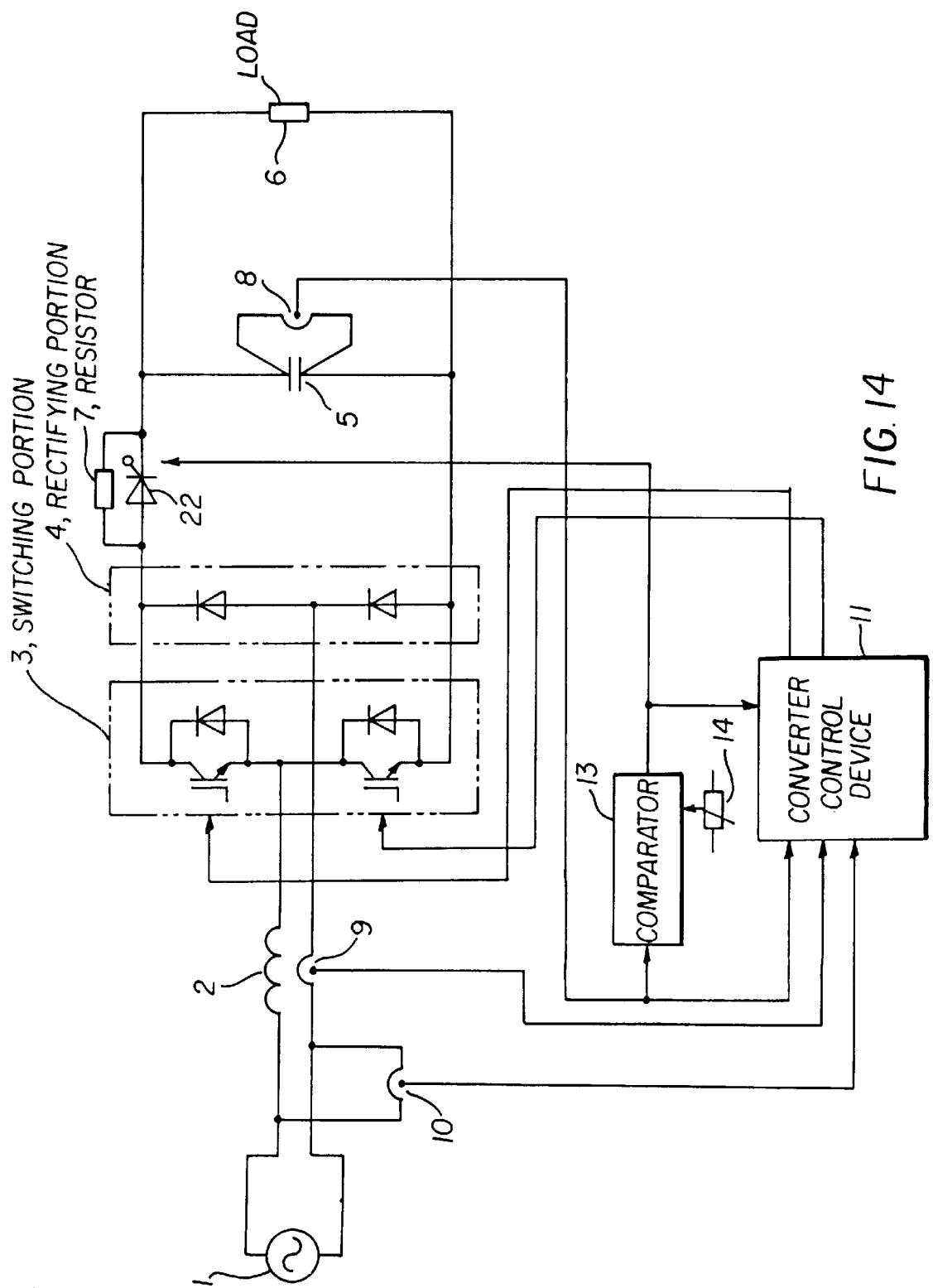
FIG. 14 is a circuit diagram for explaining a conventional method for initially charging a dc side condenser.

In FIG. 1 showing the first embodiment of the invention, the same reference numerals as used in FIGS. 13, 14 are used to identify corresponding constituent elements, which will not be described in detail, and only differences between the circuits of FIGS. 13, 14 and that of FIG. 1 will be mainly explained.

In the circuit arrangement of FIG. 1, the ac power supply 1, ac reactor 2, switching portion 3, rectifying portion 4, condenser 5, load 6, direct voltage detector 8, input current detector 9 and input voltage detector 10 are coupled in the same manner as those of the circuit arrangements of FIGS. 13 and 14. The full-wave rectifying circuit of FIG. 1 includes self-commutated semiconductor switching elements 19U, 19D, such as IGBT, and diodes 4U, 4D, 20U and 20D. The ac reactor 2 may be provided by leakage inductance of a transformer (not shown) connected to the ac input side. In the present embodiment, the resistor 7 for limiting the rush current is provided between a coupling point of the diodes 20U, 20D of the switching portion 3 and the positive electrode of the condenser 5.

The converter control device 11 is adapted to receive detected values of the input voltage detector 10, input current detector 9, and direct voltage detector 8, and output signals from the comparator 13. Also, the comparator 13 receives detected values of the direct voltage detector 8, and a polarity detector 12 receives detected values of the input voltage detector 10.

The converter control device 11 generates a control signal directly to the switching element 19U in the upper arm of the switching portion 3, and generates a control signal to the switching element 19D in the lower arm of the switching portion 3, through a logical operation element 16 consisting of an OR-gate. The logic operation element 16 has two input terminals, one of which receives the control signal for the switching element 19D from the converter control device 11. On the other hand, the output signal of the comparator 13 is transmitted to the monostable multivibrator 15, and then to the other input terminal of the logic operation element 16. A logic operation element 17 consisting of an AND-gate receives the output signal of the logic operation element 16 and an output signal of the polarity detector 12, and generates an output signal as the control signal for the switching element 19D in the lower arm of the switching portion 3.

The operation of the above-described circuit will be now explained.

The converter control device 11 computes control signals so that the input voltage waveform detected by the input voltage detector 10 coincides with the input current waveform detected by the input current detector 9. The comparator 13 compares the terminal voltage of the condenser 5 with the predetermined value set by the level setting device 14, and generates a signal when the terminal voltage exceeds the predetermined value. The monostable multivibrator 15 receives this signal as a trigger signal, and generates pulses having a constant time width.

On the other hand, the polarity detector 12 detects a half cycle of the ac power supply voltage from the detected value of the input voltage detector 10, and generates a polarity signal as a result of the detection to the logic operation element 17.

The logic operation element 17 receives, through the logic operation element 16, the control signal generated by the converter control device 11 for the switching element 19D, along with the output pulses of the monostable multivibrator 15, and generates a control signal under the AND condition with the polarity signal from the polarity detector 12.

In the normal operations with the load, the ON/OFF state of the switching element 19U of the upper arm is directly controlled by the control signal from the converter control device 11, at a frequency sufficiently higher than the ac input frequency. The ON/OFF state of the switching element 19D of the lower arm is controlled by the control signal transmitted at each half cycle of the ac input voltage. Thus, the dc side of the ac/dc converting circuit can provide an output voltage that is higher than a voltage obtained by rectifying the fill wave of the alternating input voltage.

If the energy returns from the load 6, the terminal voltage of the condenser 6 increases, and, if it exceeds the predetermined value, the comparator 13 generates a signal to be received by the converter control device 11 and monostable multivibrator 15. Upon receipt of the signal from the comparator 13, the converter control device 11 stops generating the control signal for the switching element 19U in the upper arm of the switching portion 3.

At the same time, the converter control device 11 generates the control signal for the switching element 19D of the lower arm through the logic operation elements 16, 18, only during a half-cycle period in which the condenser 5 does not operate in a voltage increase mode (for obtaining a higher direct voltage than the voltage obtained by rectifying the full wave of the alternating input voltage) even if the switching element 19D is actuated, based on the polarity of the power supply voltage detected by the polarity detector 12. During the half-cycle period, the voltage of a coupling point (one of ac input terminals) of the upper and lower arms of the switching portion 3 is lower than the voltage of a coupling point (the other ac input terminal) of the diodes 4U, 4D of the rectifying portion 4. Consequently, a closed circuit consisting of the condenser 5, resistor 7, and switching element 19D is formed, so that the regenerative energy stored in the condenser 5 can be consumed as discharger current by the resistor 7.

Thus, in the present embodiment, the switching element 19D in the full wave rectifying circuit (switch portion 3) is utilized as a switching element through which discharge current flows when the terminal voltage of the condenser 5 is increased due to the regenerative energy. This arrangement eliminates a need to separately provide the switching element 19 for this purpose as in the circuit of FIG. 13.

Figure 2:
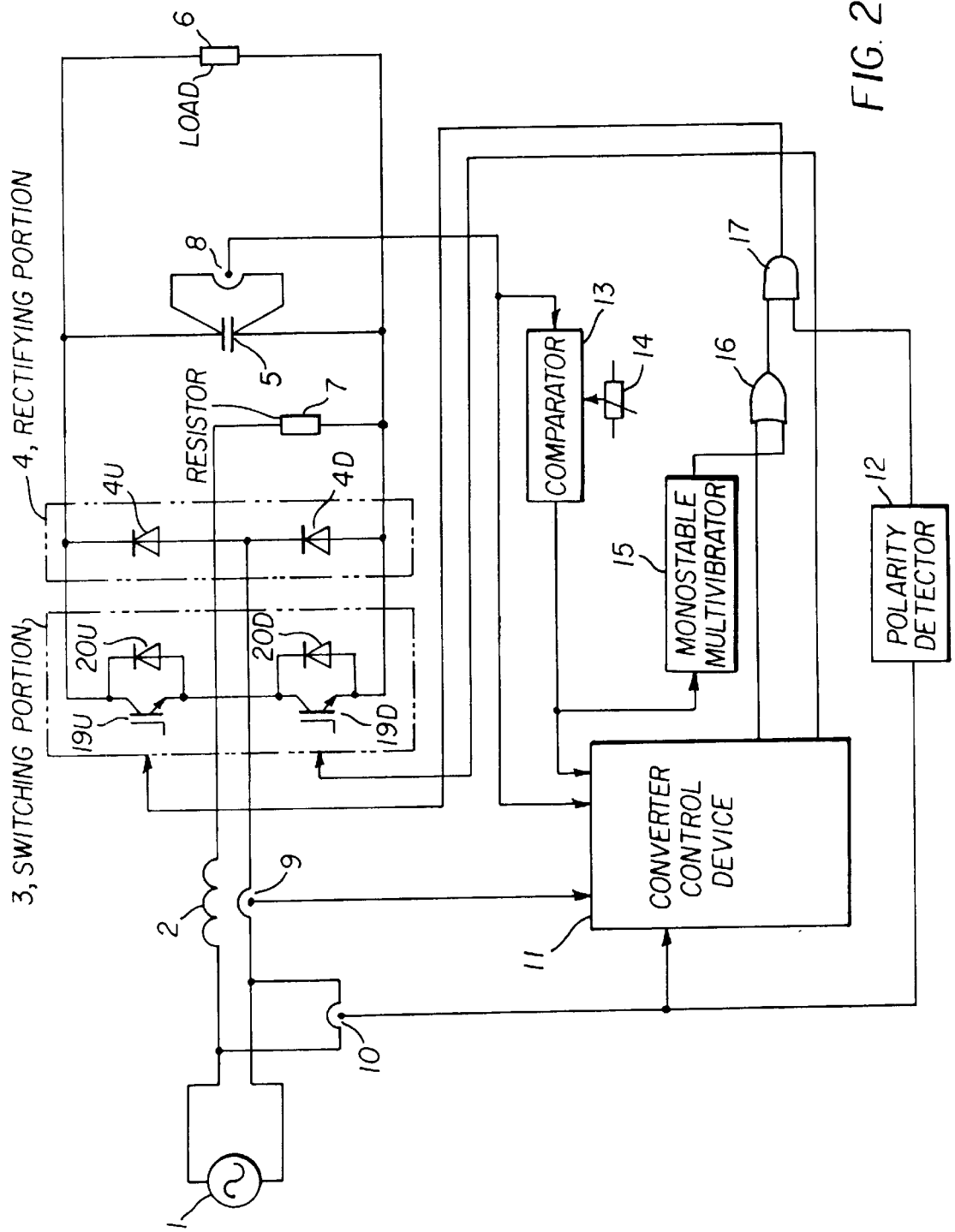
FIG. 2 is a circuit diagram showing the second embodiment of the present invention.

Referring next to FIG. 2, the second embodiment of the present invention will be described, mainly discussing differences between the circuit arrangements of FIG. 2 and FIG. 1.

In FIG. 2, the resistor 7 is connected between the coupling point of the upper and lower arms of the switching portion 3, and the negative electrode of the condenser 5. As in the arrangement of FIG. 1, the switching element 19D of the lower arm receives the control signal directly from the converter control device 11, and the switching element 19U of the lower arm receives the control signal from the converter control device 11, through the logic operation elements 16, 17.

In the present embodiment, the control device 11 turns off the switching element 19D when the terminal voltage of the condenser 5 increases due to the regenerative energy. At the same time, the switching element 19U of the upper arm is operated in response to the control signal from the logic operation element 17, only during a period in which the condenser 5 does not operate in a voltage increase mode, namely, during a half-cycle period in which the voltage of the coupling point of the upper and lower arms of the switching portion 3 is higher than that of the coupling point between the diodes 4U, 4D. As a result, a closed circuit consisting of the condenser 5, switching element 19U of the upper arm and the resistor 7 is formed so as to discharge the condenser 5. Thus, the switching element 19U of the switching portion 3 is utilized to dispose of the regenerative energy, similarly to the embodiment of FIG. 1.

Figure 3:
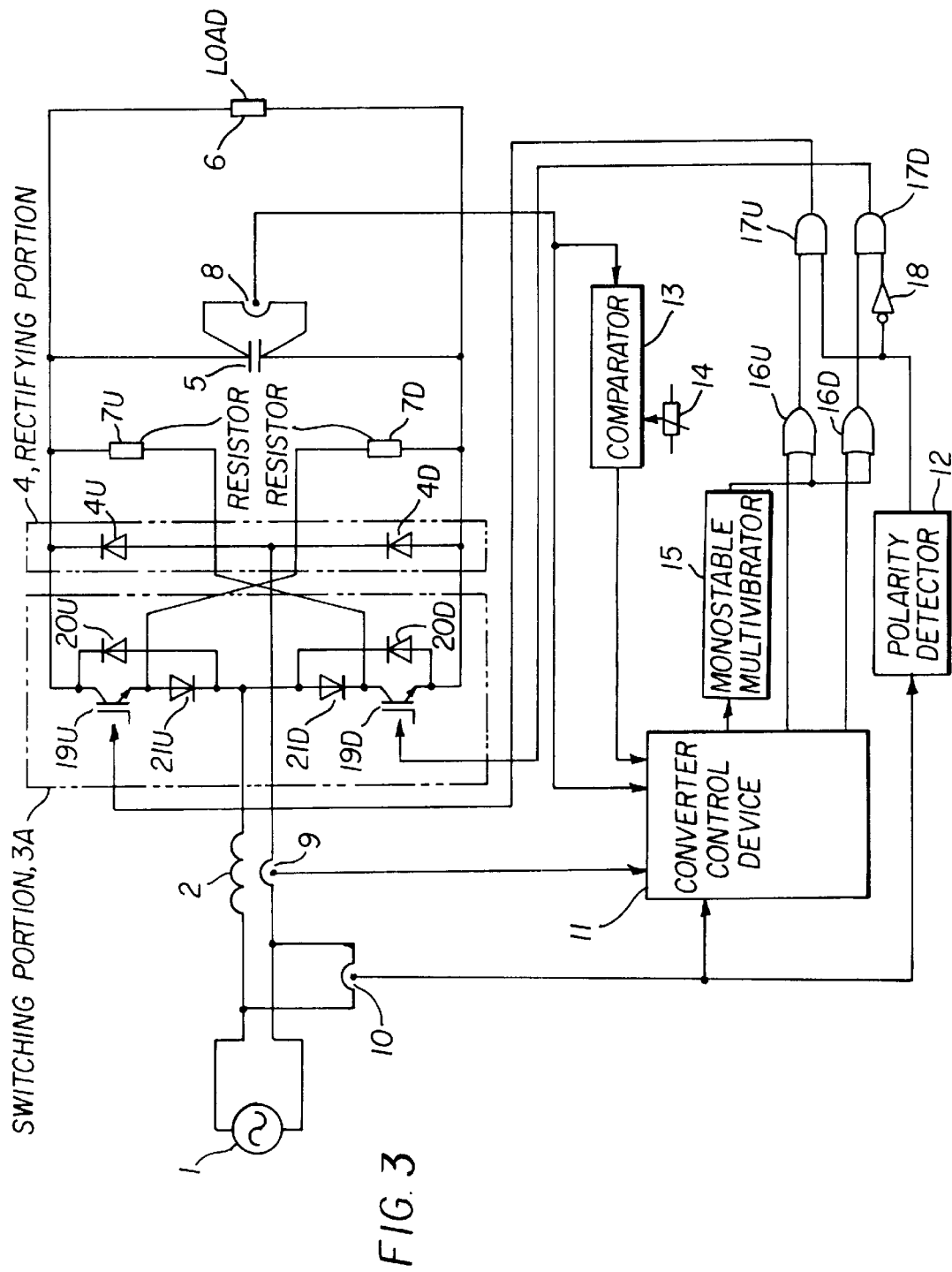
FIG. 3 is a circuit diagram showing the third embodiment of the present invention.

Referring next to FIG. 3, the third embodiment of the present invention will be described, mainly discussing differences between the circuit arrangements of FIG. 3 and FIG. 1. In this embodiment, the upper arm of a switching portion 3A consists of a diode 20U, and a series circuit of a switching element 19U and a diode 21U, which circuit is reversely coupled in parallel to the diode 20U. The lower arm of the switching portion 3A consists of a diode 20D, and a series circuit of a switching element 19D and a diode 12D, which circuit is reversely connected in parallel to the diode 20D. A resistor 7D is connected between a coupling point of the switching element 19U and the diode 21U of the upper arm, and the negative electrode of the condenser 5, and a resistor 7U is connected between a coupling point of the switching element 19D and the diode 21D of the lower arm and the positive electrode of the condenser 5. On the other hand, each of logic operation elements 16U, 16D receives output pulses of the monostable multivibrator 15, along with control signals from the converter control device 11 for controlling the upper and lower arms of the switching portion 3. A logic operation element 17U receives an output signal of the logic operation element 16U and an output signal of the polarity detector 12, and a logic operation element 17D receives an output signal of the logic operation element 16D, and a signal transmitted from a logic operation element 18 as a NOT circuit to which an output signal of the polarity detector 12 is applied. The logic operation element 17U then generates a control signal to the switching element 19U of the upper arm, and the logic operation element 17D generates a control signal to the switching element 19D of the lower arm.

In the present embodiment, when the terminal voltage of the condenser 5 exceeds the predetermined value due to the regenerative energy, the control signals for the switching elements 19U, 19D are generated in the following manner. Namely, in a half-cycle period in which the voltage of the coupling point of the upper and lower arms of the switching portion 3A is lower than that of the coupling point of the diodes 4U, 4D of the rectifying portion 4, the switching element 19U of the upper arm is turned off and the switching element 19D is actuated, as in the embodiment of FIG. 1. In a half-cycle period in which the voltage of the coupling point of the upper and lower arms of the switching portion 3A is higher than that of the coupling point of the diodes 4U, 4D of the rectifying portion 4, the switching element 19D of the lower arm is turned off and the switching element 19U of the upper arm is actuated, as in the embodiment of FIG. 2.

In this manner, a closed circuit consisting of the condenser 5, resistor 7U and switching element 19D, or a closed circuit consisting of the condenser 5, switching element 19U and resistor 7D are formed, so that the regenerative energy is consumed by the resistor 7U or 7D. Thus, the switching element 19D or 19U in the switching portion 3A is utilized as in the first and second embodiments, so as to dispose of the regenerative energy.

Figure 4:
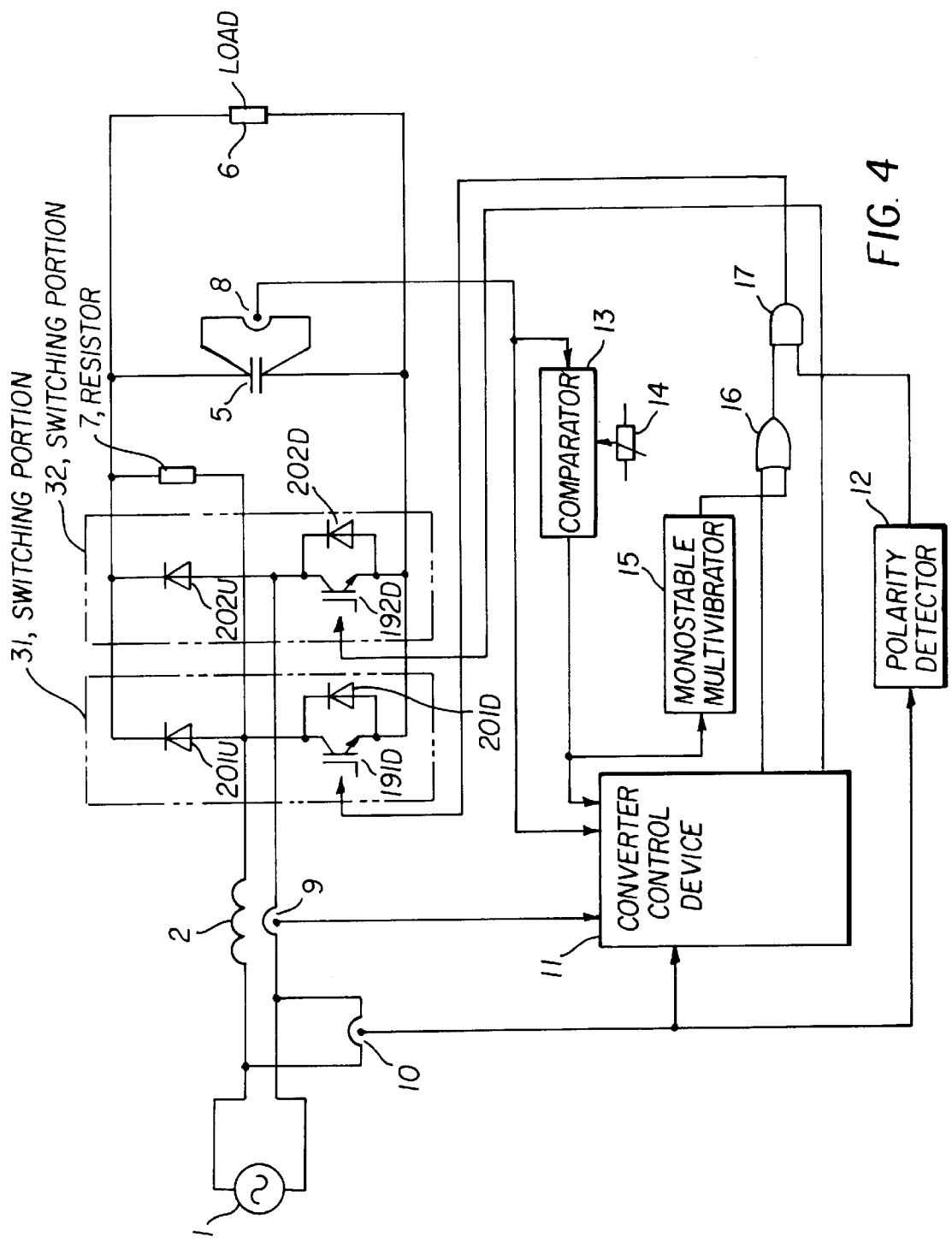
FIG. 4 is a circuit diagram showing the fourth embodiment of the present invention.

FIG. 4 shows the fourth embodiment of the present invention.

In the present embodiment, the full wave rectifying circuit is constituted by switching portions 31, 32. The switching portion 31 consists of a diode 201U, switching element 191D, and a diode 201D, and the switching portion 32 consists of a diode 202U, switching element 192D, and a diode 202D.

The control circuit is constructed in the same manner as in the embodiment of FIG. 1, wherein the switching element 191D in the switching portion 31 receives the control signal from the logic operation element 17, while the switching element 192D in the switching portion 32 receives the control signal directly from the converter control device 11.

In the present embodiment, when the terminal voltage of the condenser 5 exceeds the predetermined value due to the regenerative energy, the control device 11 turns off the switching element 192D. At the same time, the control signal is generated from the logic operation element 17 to the switching element 191D to actuate this element 191D, in a half-cycle period in which the voltage at a coupling point of the diode 201U and the switching element 191D is lower than the voltage at a coupling point of the diode 202U and the switching element 192D. As a result, a closed circuit consisting of the condenser 5, resistor 7 and switching element 191D is formed, so that the regenerative energy is consumed by the resistor 7.

Figure 5:
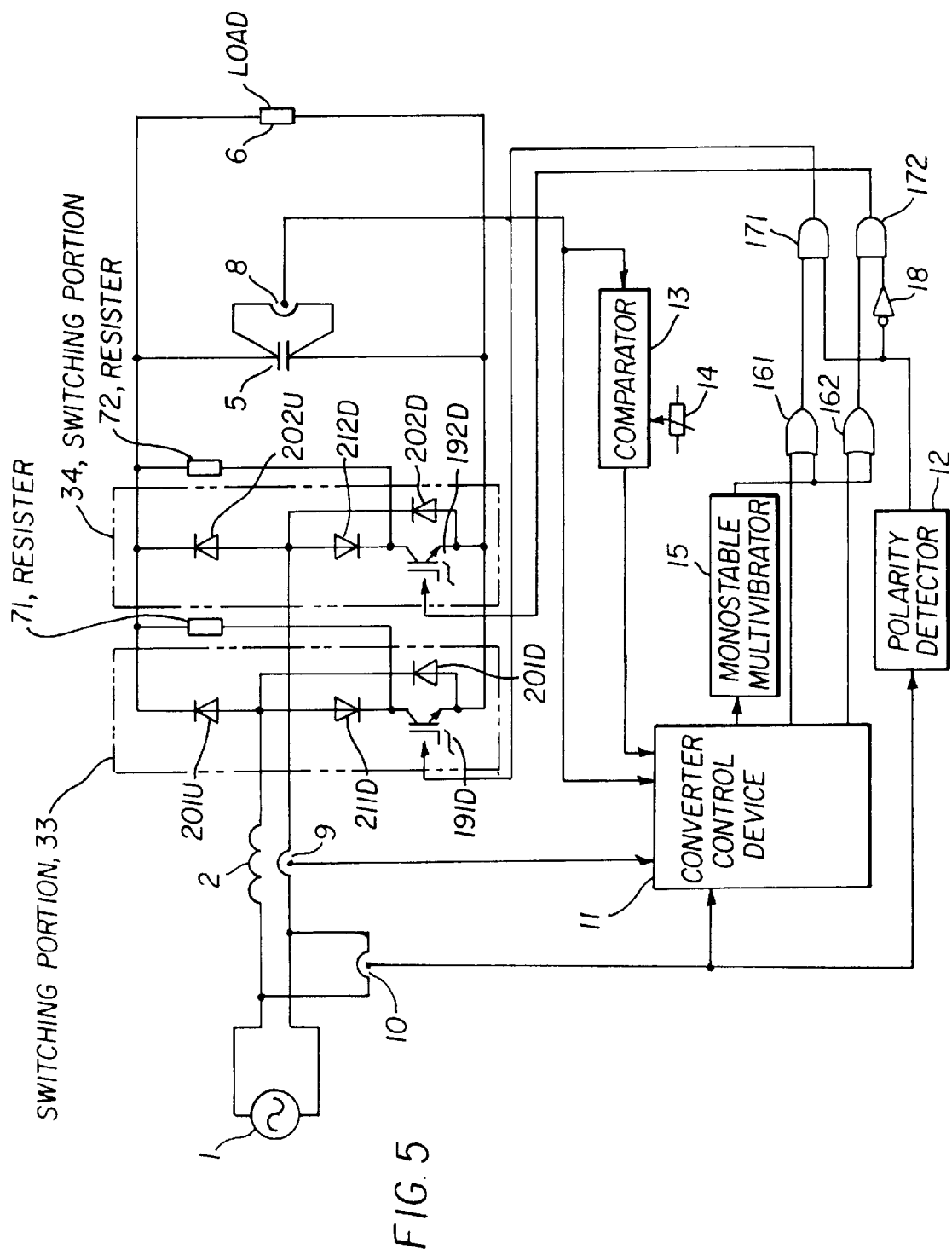
FIG. 5 is a circuit diagram showing the fifth embodiment of the present invention.

Referring next to FIG. 5 showing the fifth embodiment of the present invention, switching portions 33,34 constitute a full wave rectifying circuit, wherein the switching portion 33 consists of diodes 201U, 211D, 201D and switching element 191D, and the switching portion 34 consists of diodes 202U, 212D, 202D and switching element 192D. Further, a resistor 71 is connected between a coupling point of the diode 211D and the switching element 191D, and the positive electrode of the condenser 5, and a resistor 72 is connected between a coupling point of the diode 212D and the switching element 192D, and the positive electrode of the condenser 5.

The control circuit of the present embodiment is constructed in substantially the same way as that of the third embodiment of FIG. 3. Namely, the switching element 191D receives the control signal from the logic operation element 171, and the switching element 192D receives the control signal from the logic operation element 172. In FIG. 5, reference numerals 161, 162 denote logic operation elements in the form of OR-gates.

In the present embodiment, when the terminal voltage of the condenser 5 exceeds the predetermined voltage due to the regenerative energy, the control device 11 turns off the switching element 192D during a half-cycle period in which the voltage at a coupling point between the resistor 71 and the switching element 191D is lower than the voltage at a coupling point between the diode 212D and the switching element 192D. At the same time, the control signal is generated from the logic operation element 171 to the switching element 191D so as to actuate this element 191D. As a result, a closed circuit consisting of the condenser 5, resistor 71 and switching element 191D is formed so that the regenerative energy is consumed by the resistor 71.

In a half-cycle period in which the voltage at the coupling point between the resistor 71 and the switching element 191D is higher than the voltage at the coupling point between the diode 212D and the switching element 192D, on the other hand, the control device 11 turns off the switching element 191D, and causes the logic operation element 172 to generate the control signal to the switching element 192D so as to actuate this element. As a result, a closed circuit consisting of the condenser 5, resistor 72, and switching element 192D is formed so that the regenerative energy is consumed by the resistor 72.

Figure 6:
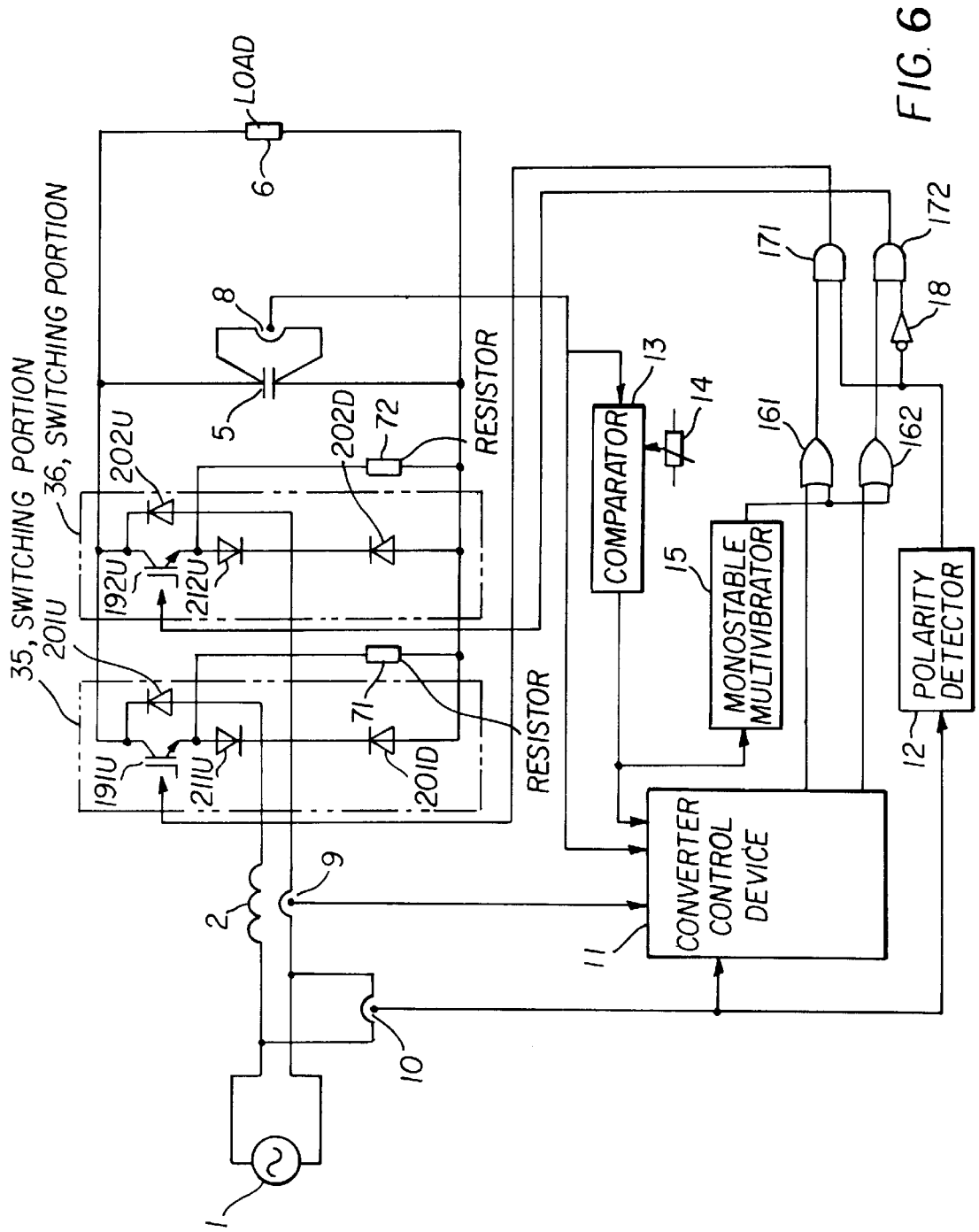
FIG. 6 is a circuit diagram showing the sixth embodiment of the present invention.

Referring next to FIG. 6 showing the sixth embodiment of the present invention, switching portions 35,36 constitute a full wave rectifying circuit, wherein the switching portion 35 consists of a switching element 191U and diodes 211U, 201U and 201D, and the switching portion 36 consists of a switching element 192U and diodes 212U, 202U and 202D. Further, resistor 71 is connected between a coupling point of the switching element 191U and diode 211U, and the negative electrode of the condenser 5, and resistor 72 is connected between a coupling point of the switching element 192U and diode 212U.

The control circuit of the present embodiment is constructed in the same way as that of the embodiment of FIG. 5. Namely, wherein the switching element 191U receives a control signal from the logic operation element 171, and the switching element 192U receives a control signal from the logic operation element 172.

When the terminal voltage of the condenser 5 exceeds the predetermined value due to the regenerative energy, the switching element 192 is turned off by the logic operation element 172 in a half-cycle period in which the voltage at a connection point between the switching element 191U and the resistor 71 is higher than the voltage at a coupling point between the switching element 192U and the diode 212U. At the same time, the control signal is generated from the logic operation element 171 to the switching element 191U so as to actuate this element. As a result, a closed circuit consisting of the condenser 5, switching element 191U and resistor 71 is formed so that the regenerative energy is consumed by the resistor 71.

In a half-cycle period in which the voltage at the coupling point between the switching element 191U and the resistor 71 is lower than the voltage at the coupling point between the switching element 192U and the diode 212U, on the other hand, the switching element 191U is turned off by the logic operation element 171. At the same time, the control signal is generated from the logic operation element 172 to the switching element 192U so as to actuate this element 192U. Thus, a closed circuit consisting of the condenser 5, switching element 192U and resistor 72 is formed so that the regenerative energy is consumed by the resistor 72.

Referring next to FIG. 7 through FIG. 12, some embodiments of the present invention will be described which have a function of limiting the rush current by initial charging of the dc side condenser, as well as the above-described function of disposing of the regenerative energy.

Figure 7:
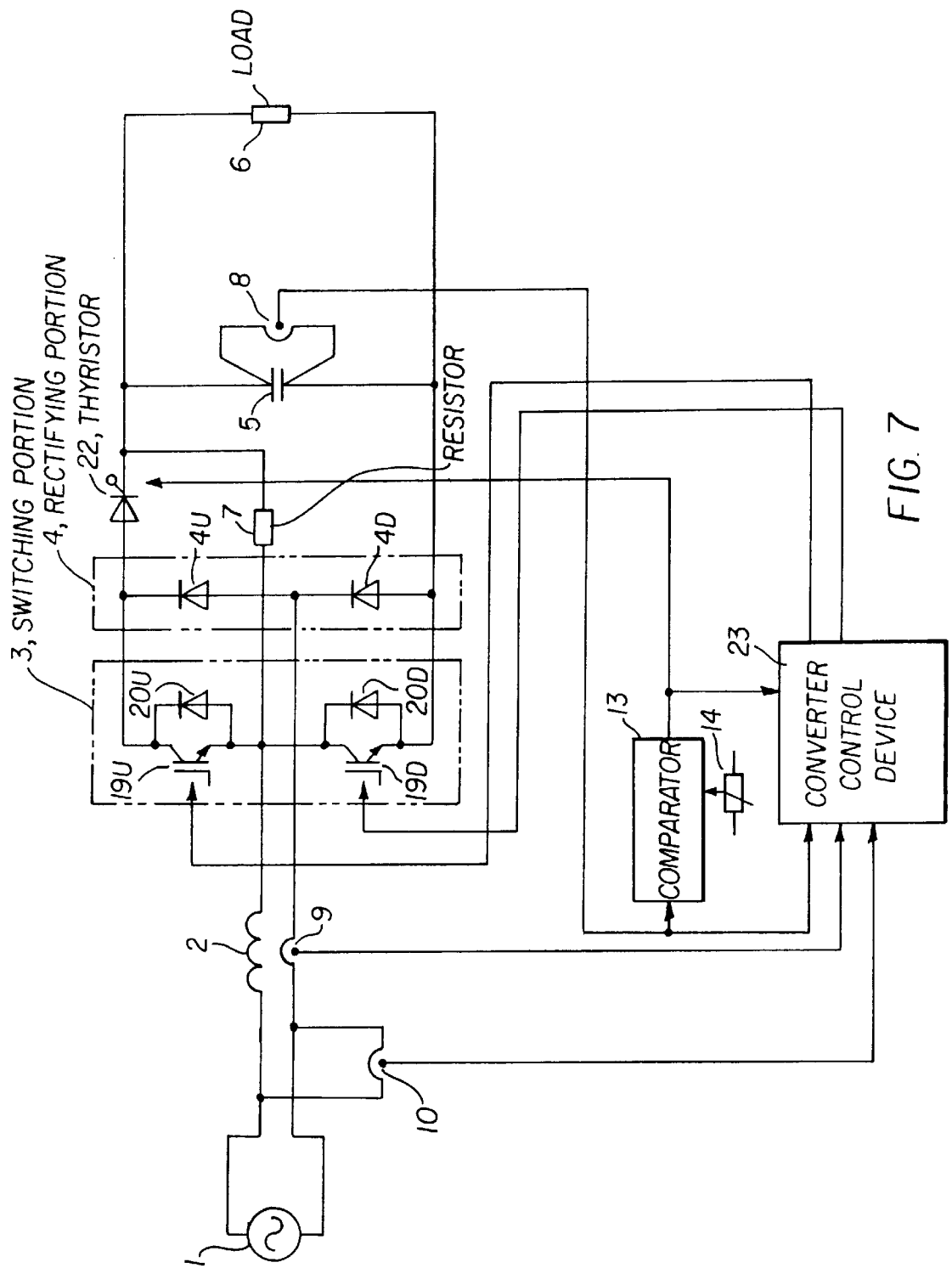
FIG. 7 is a circuit diagram showing the seventh embodiment of the present invention, which is a modification of the first embodiment.

FIG. 7 shows the seventh embodiment of the present invention, whose principal portion is identical with that of the embodiment of FIG. 1. This embodiment is different from the first embodiment in that a thyristor 22 as a semiconductor switching element is coupled between the cathode of the diode 4U and one end of the resistor 7 (on the side of the positive electrode of the condenser 5), such that the thyristor 22 is activated in response to a gate signal received from the comparator 13.

In FIG. 7, reference numeral 23 denotes a converter control device which includes all of the converter control device 11, polarity detector 12, monostable multivibrator 15, and logic operation elements 16, 17 as shown in FIG. 1. This control device 23 generates control signals to the switching elements 19U, 19D in the same manner as in the embodiment of FIG. 1.

The present invention is characterized in the manner in which the rush current is limited by initially charging the condenser 5 when the power supply is turned on. Namely, when the ac power supply 1 is turned on, the condenser 5 is initially changed by current that is limited by the resistor 7. Since the terminal voltage of the condenser 5 is lower than the predetermined value set by the level setting device 14 at this time, no gate signal is generated by the comparator 13, and the thyristor 22 is in the OFF state. Thus, there is no possibility that excessively large rush current flows into the condenser 5 when the power supply is turned on.

When the energy is regenerated from the load 6, the terminal voltage of the condenser 5 increases, and, when it exceeds the predetermined value, the comparator 13 generates the gate signal to turn on the thyristor 22. As a result, the circuit of FIG. 7 operates in the same manner as that of FIG. 1, and the regenerative energy stored in the condenser 5 is consumed by the resistor 7.

In the present embodiment, only the thyristor 22 is added to the circuit arrangement of FIG. 1, and the resistor 7 for consuming the regeneration energy is also used for limiting the rush current. Thus, the number of components is not substantially increased, and the manufacturing cost can be thus reduced.

Figure 8:
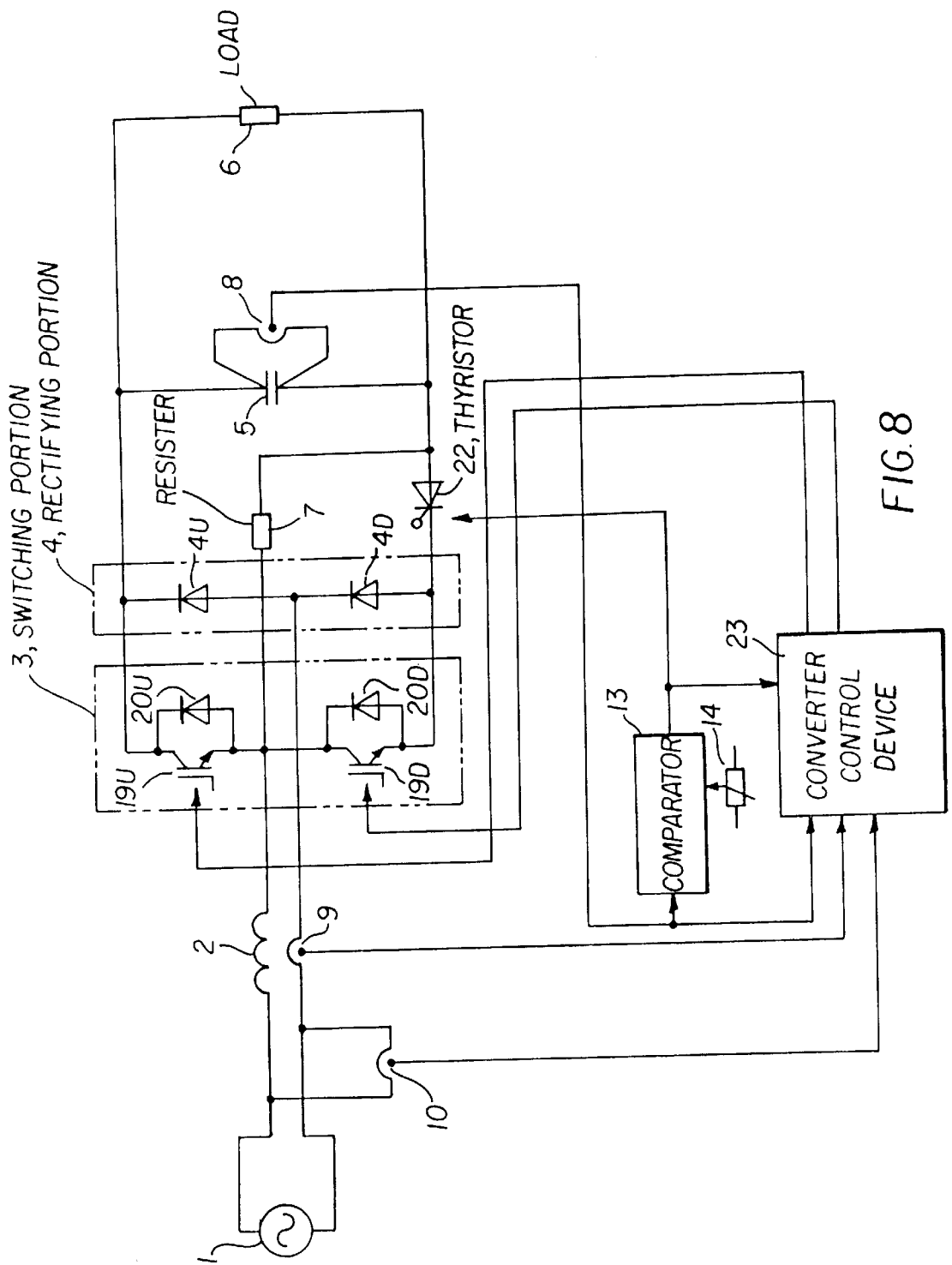
FIG. 8 is a circuit diagram showing the eighth embodiment of the present invention, which is a modification of the second embodiment.

Referring to FIG. 8 showing the eighth embodiment of the present invention, a principal portion of the circuit arrangement of this embodiment is identical with that of the second embodiment of FIG. 2. The difference between these embodiments is in that a thyristor 22 is coupled between the anode of the diode 4D and one end of the resistor 7 (on the side of the negative electrode of the condenser 5), such that the thyristor 22 is activated in response to the gate signal from the comparator 13. In this case, the control signals for controlling the switching elements 19U, 19D are generated by the converter control device 23 in the same manner as in the second embodiment of FIG. 2.

Figure 9:
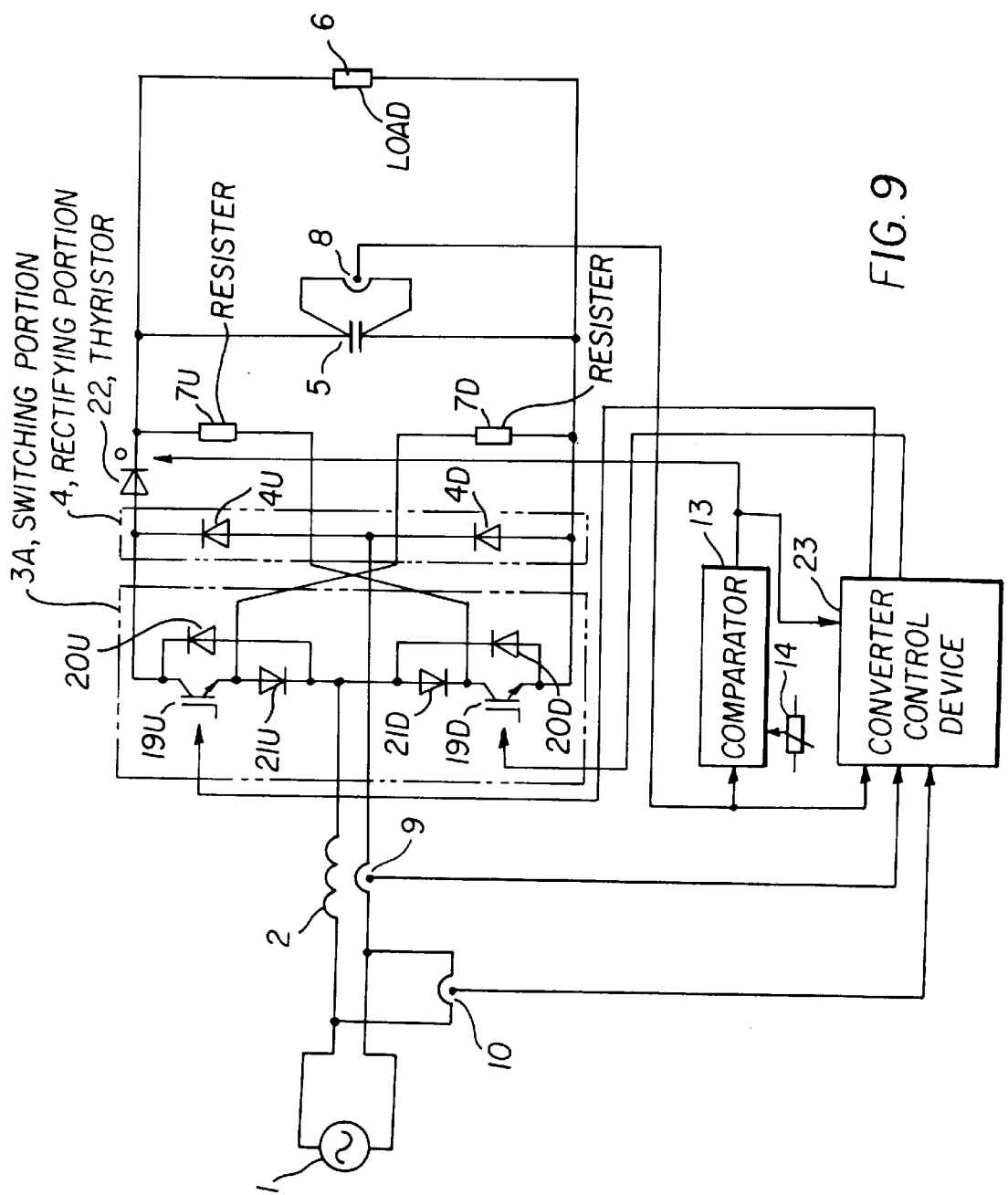
FIG. 9 is a circuit diagram showing the ninth embodiment of the present invention, which is a modification of the third embodiment.

Referring next to FIG. 9 showing the ninth embodiment of the invention, a principal portion of the circuit arrangement of this embodiment is identical with that of the third embodiment of FIG. 3. The difference between these embodiments is in that the thyristor 22 is coupled between the cathode of the diode 4U and one end of the resistor 7U (on the side of the positive electrode of the condenser 5), such that the thyristor 22 is activated in response to the gate signal from the comparator 13. In this case, the control signals for controlling the switching elements 19U, 19D are generated by the converter control device 23 in the same manner as in the embodiment of FIG. 3.

Figure 10:
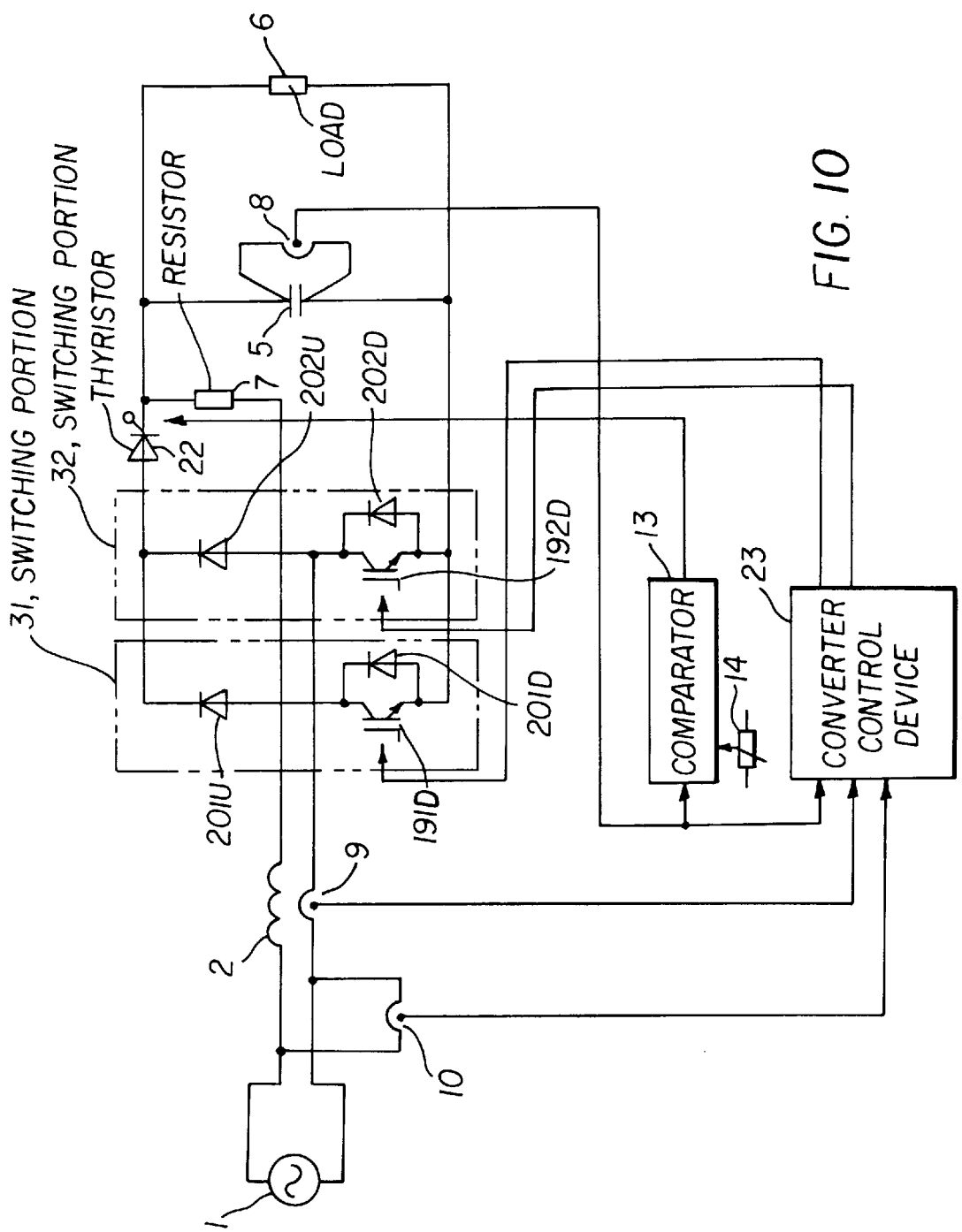
FIG. 10 is a circuit diagram showing the tenth embodiment of the present invention, which is a modification of the fourth embodiment.

Referring to FIG. 10 showing the tenth embodiment of the invention, a principal portion of this embodiment is identical with that of the fourth embodiment of FIG. 4, and the difference between these embodiments is in that the thyristor 22 is coupled between the cathode of the diode 202U and one end of the resistor 7 (on the side of the positive electrode of the condenser 5), such that the thyristor 22 is activated in response to the gate electrode from the comparator 13. In this case, too, the control signals for the switching elements 191D, 192D are generated by the converter control device 23 in the same manner as in the embodiment of FIG. 4.

In the above-described embodiments of FIGS. 8, 9 and 10, the resistor(s) 7, 7U, 7D and the thyristor 22 operate in the same manner as those of the embodiment of FIG. 7. Thus, the circuit arrangements of FIGS. 8, 9, 10 can fulfill both functions of limiting the rush current and consuming the regenerative energy, only by adding the thyristor 22 to each circuit.

Figure 11:
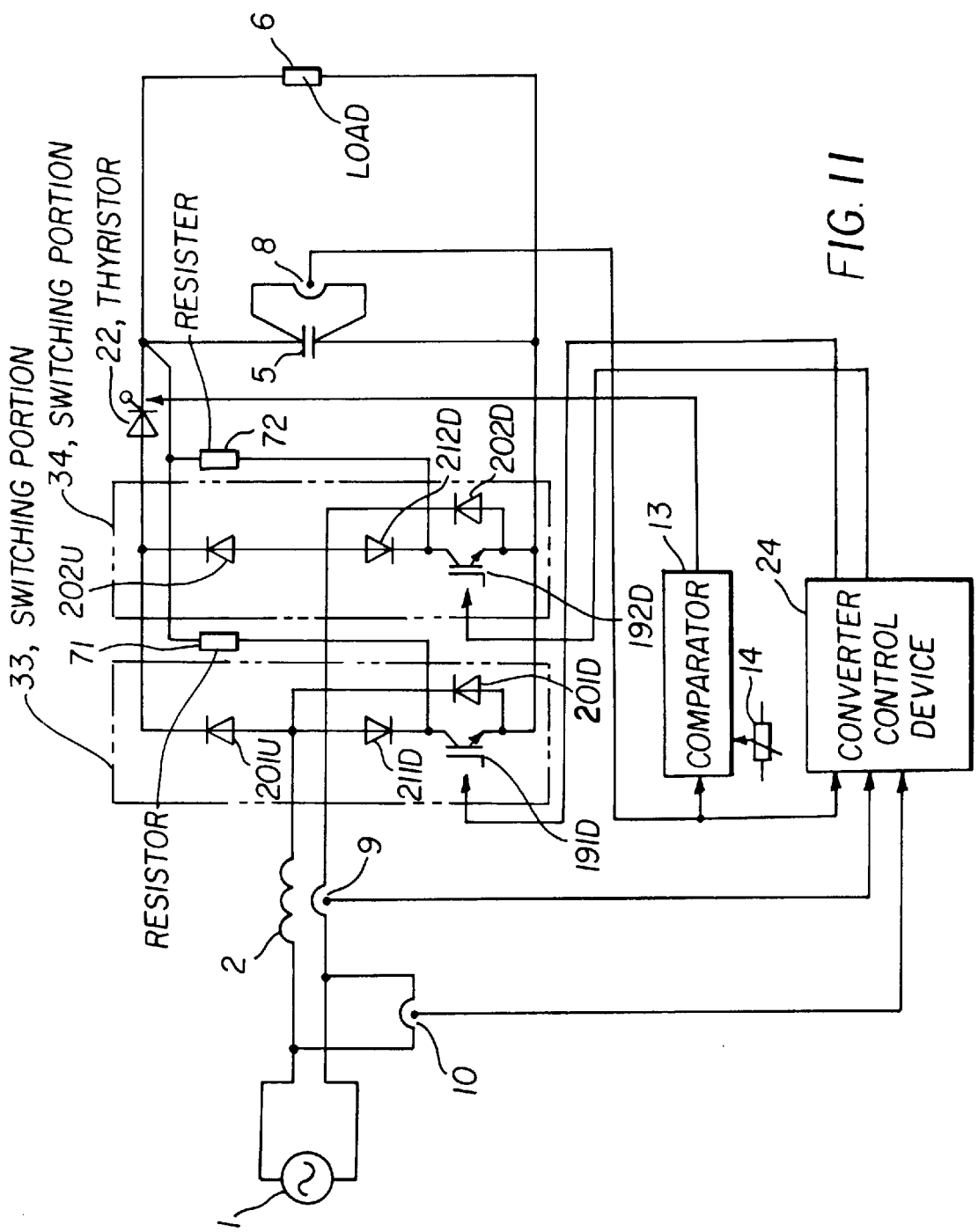
FIG. 11 is a circuit diagram showing the eleventh embodiment of the present invention, which is a modification of the fifth embodiment.

Referring to FIG. 11 showing the eleventh embodiment of the present invention, a principal portion of this embodiment is identical with that of the fifth embodiment of FIG. 5, and the difference between these embodiments is in that the thyristor 22 is coupled between the cathode of the diode 202U and one end of each of the resistors 71, 72 (on the side of the positive electrode of the condenser 5), such that the thyristor 22 is activated in response to a gate signal from the comparator 13. The control signals for controlling the switching elements 191D, 192D are generated by the converter control device 24 in the same manner as in the embodiment of FIG. 5. It is to be noted that the converter control device 24 of the present embodiment includes the converter control device 11, polarity detector 12, monostable multivibrator 15, and logic operation elements 161, 162, 171, 172, 18 as shown in FIG. 5.

Figure 12:
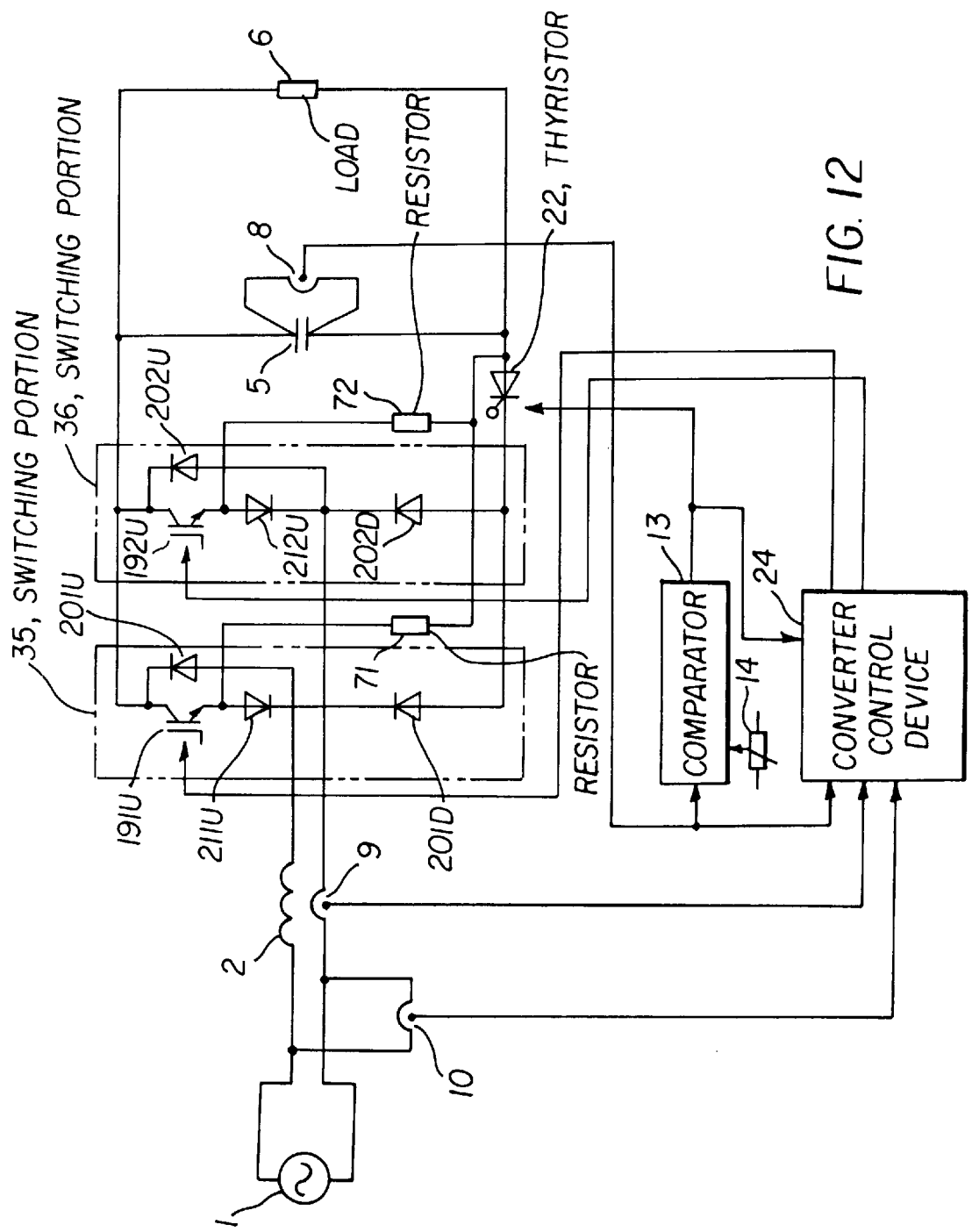
FIG. 12 is a circuit diagram showing the twelfth embodiment of the present invention, which is a modification of the sixth embodiment.

Referring to FIG. 12 showing the twelfth embodiment of the invention, a principal portion of this embodiment is identical with that of the sixth embodiment of FIG. 6, and the difference between these embodiments is in that a thyristor 22 is provided between the anode of the diode 202D and one end of each of the resistors 71, 72 (on the side of the negative electrode of the condenser 5), such that the thyristor 22 is activated in response to a gate signal from the comparator 13. The control signals for controlling the switching elements 191U, 192U are generated by the converter control device 24 in the same manner as in the embodiment of FIG. 6.

In the above-described embodiments of FIGS. 11 and 12, the resistors 71, 72 and the thyristor 22 operate in the same manner as those of the embodiment of FIG. 7. Thus, the circuit arrangements of FIGS. 11, 12 can fulfill both functions of limiting the rush current and consuming the regenerative energy, only by adding the thyristor 22 to each circuit.

In the embodiments of FIG. 7 through FIG. 12, the thyristor 22 may be replaced by a self-commutated semiconductor switching element, such as IGBT, GTO or other type of transistor, for example.

As described above with respect to the first to sixth embodiments of the invention, in the ac/dc converting circuit capable of providing a direct output voltage that is higher than a voltage obtained by rectifying the full wave of an alternating input voltage, the self-commutated semiconductor switching element in the full wave rectifying circuit is also used as a switching element for causing the resistor to consume the regenerative energy stored in the condenser. This arrangement eliminates a need to provide a separate switching element for this purpose, thereby avoiding increases in the number of components and the volume of the apparatus. Consequently, the cost and installation space required for this circuit can be reduced.

In addition, the embodiments of FIGS. 7 and 8 can fulfill the function of preventing the rush current from flowing into the condenser by initially charging the condenser, as well as the above function of disposing of the regenerative energy, without increasing the number of components in the main circuit as compared with that of the known circuit arrangement. In this respect, too, the ac/dc converting circuit according to the present invention is advantageous in terms of cost and efficiency.

What is claimed is:

1. An AC/DC converter circuit that outputs a higher DC voltage than a DC output voltage obtained by full wave rectification of an AC input voltage, said AC/DC converter circuit comprising:

a full wave rectifying circuit comprising at least two arms including semiconductor switching elements;

an AC reactor connected in series to an AC input side of the full-wave rectifier circuit;

a condenser connected to a DC output side of the full wave rectifying circuit; and a resistor connected to the full wave rectifying circuit and a terminal of the condenser;

wherein the resistor, the condenser and the semiconductor switching elements of at least one of the arms comprise a closed current loop through which the condenser can be discharged; and wherein said full wave rectifying circuit includes a switching portion having an upper arm and a lower arm formed by coupling a first semiconductor rectifying element reversely coupled in parallel with a first self-commutated semiconductor switching element, in series with a second semiconductor rectifying element reversely coupled in parallel with a second self-commutated semiconductor switching element, and a rectifying portion having an upper arm and a lower arm formed by coupling a third semiconductor rectifying element in series with a fourth semiconductor rectifying element said first and third semiconductor rectifying elements in the upper arms of said switching portion and said rectifying portion having a common cathode coupled to a positive electrode of said condenser, said second and fourth semiconductor rectifying elements in the lower arms of said switching portion and said rectifying portion having a common anode coupled to a negative electrode of said condenser, said full wave rectifying circuit having first and second AC input terminals respectively provided by a coupling point of said first and second rectifying elements of said switching portion and a coupling point of said third and fourth rectifying elements of said rectifying portion;

wherein said resistor is provided between said coupling point of the first and second rectifying elements of the switching portion and said positive electrode; and wherein a signal for controlling an ON/OFF state of said second switching element of said lower arm is generated while said first switching element of said upper arm is placed in an OFF state, when the direct output voltage is higher than the input alternating voltage, and a voltage at said first AC input terminal coupled to said resistor is lower than a voltage at said second AC input terminal.

2. An AC/DC converting circuit as defined in claim 1, further comprising a semiconductor switching element provided between said common cathode commonly coupled to said first and third semiconductor rectifying elements of the upper arms of the full wave rectifying circuit, and a coupling point of said resistor and said positive electrode.

* * * * *